Aug. 12, 1969 K. R. DOMNICK 3,460,680

FILTER MEDIA SUPPORT WITH FILTER MEDIUM

Filed Sept. 20, 1967

United States Patent Office 3,460,680
Patented Aug. 12, 1969

3,460,680
FILTER MEDIA SUPPORT WITH FILTER MEDIUM
Keith R. Domnick, East Boldon, Durham, England
Continuation-in-part of application Ser. No. 434,443,
Feb. 23, 1965. This application Sept. 20, 1967, Ser.
No. 669,241
Int. Cl. B01d 27/08, 27/02
U.S. Cl. 210—315                       6 Claims

ABSTRACT OF THE DISCLOSURE

A fluid filter medium for the complete removal from the fluid of substances such as viruses and bacteria having the dimensions of the order of 1 micron and less, is supported between two fluid permeable support members, edge regions of the fluid filter medium juxtaposed between such permeable support members being sealed with a fluid impervious sealant.

---

This is a continuation-in-part application of U.S. Ser. No. 434,443, filed Feb. 23, 1965, now bandoned.

The present invention concerns improvements in or relating to filters for fluids, and the manufacture thereof.

The invention is particularly, although not exclusively, concerned with a filter for an autoclave such as is used in hospitals for the sterilization of instruments and for other purposes.

A typical hospital autoclave comprises a casing or cabinet having a door for the introduction and withdrawal of the instruments or other articles to be sterilized, an inlet for steam, means for connecting the cabinet to a source of sub-atmospheric pressure, whereby a vacuum can be created in the cabinet or casing, and an air inlet. When a sterilizing operation has been completed the cabinet is connected to the source of sub-atmospheric pressure and after a predetermined period the air inlet is opened so as to enable the cabinet to be opened and the sterilized instruments or other articles withdrawn. To avoid any risk of the sterilizing cabinet or its contents being re-contaminated the air inlet is fitted with a filter.

A particular object of the present invention is to provide a filter for this purpose, capable of excluding bacteria and viruses.

According to the present invention a filter for fluids comprises a fluid filter medium for the complete removal from the fluid of substances having dimensions of the order of one micron and less, at least two fluid permeable support members between respective support surfaces of which said fluid filter medium layer is disposed and by which it is pressed, an operational surface bounding at least one side of said fluid filter medium, the operational surface being in intimate contact with at least one of said support surfaces wherein passage means are provided for permitting passage of fluid without rupture of said fluid filter medium, edge regions of said fluid filter medium being juxtaposed between fluid permeable support members and fluid impervious sealant penetrating said edges into the fluid filter medium and bonding the said edge regions to said juxtaposed fluid permeable support members.

Preferably the fluid filter medium is disposed between and intimately supported by at least one pair of fluid permeable support members which are located one within the other, clamping means urging the fluid permeable support members on to said layer and end regions of the support members being capped by the fluid impervious sealant.

A suitable fluid filter medium can comprise open pore rubber or plastics material and be of any thickness up to 1/16". A fluid filter medium of this type would be suitable for the filtration of viruses but a boro-silicate fibre pad can also be used for this purpose, if the fibre diameter is sufficiently small.

The following are examples of the diameters of the fibres of which the pad may be constituted:

|     | Microns      |
| --- | ------------ |
| (a) | 0.05–0.099   |
| (b) | 0.10–0.199   |
| (c) | 0.20–0.499   |

The size of fibre used depends upon the size of virus or bacteria which it is intended to filter. It is frequently found that a mixture of fibre sizes can be used. The range of fibres given in (a), (b) and (c) above are all suitable for the filtration of viruses.

However if bacteria only is to be filtered, a slightly larger fibre diameter can be tolerated the sizes of which are given in example below:

|     | Microns     |
| --- | ----------- |
| (d) | 0.50–0.749  |
| (e) | 0.75–1.59   |
| (f) | 1.60–2.59   |

In all the examples of fibre diameter given above the pad is woven therewith so that the pore size is larger than the fibres per se. When a blend of fibres is used to produce a filter media capable of completely removing particles of 0.30 micron diameter, it has been ascertained that virus size particles (0.03 micron) are also removed. This phenomenon is assisted by "Brownian" motion.

A filter cloth may advantageously be arranged on each side of the fluid filter medium more especially if the pad is likely to be wetted during use. This provides a reinforcement and assists in the prevention of fibre-migration. A suitable filter cloth can be made of boro-silicate and be 0.003" thick having an open weave with warps at 63 threads per inch. The fibres themselves may be of the order 0.0074" diameter the tensile strength of which is 130 pounds per square inch.

The fluid permeable support members can be concentric cylinders or truncated cones, these being simpler to manufacture than other elongated hollow members but the possible use of rectangular section elongated hollow members cannot be disregarded. The concentric support members constructed of perforated or expanded metal or plastics material are the most suitable, the spacing between these two members leaving a gap of about 1/8". Any sintered metal or plastics material, with perforations can be used. When expanded sheet material is used, rhomboidal perforations occur and it has been found in practice that the distance between the farthest apart pair of apexes is of the order of 1/8''' whilst the distance between the nearest pair of apexes is of the order of 1/32"; 26 gauge stainless steel has proved satisfactory having a total perforation area of 43% the overall area of the final support area. Brass or cadmium plated mild steel are also suitable as well as a perforated plastics material which is strong enough to hold the fluid filter medium under compression.

In one embodiment the inner support member is formed from a rolled up sheet of material, the adjacent edges of which are spot-welded together at about 1/2" intervals, or otherwise securely connected together to prevent subsequent tearing of the fluid filter medium, alternately a cylinder can be extruded in some manner or injection moulded if made of plastics material.

The outer cylinder, for ease of manufacture, is of the same material as the inner cylinder and is also in the form of sheet material rolled over the inner support member and fluid filter medium. The edges of this outer sheet, after rolling, are flanged outwardly and closed by any suitable means such as a metal fastener slid thereover.

In the event of the outer support member being of plastic material, the edges can be welded together or held by other securing means. If the outer support member is of brass the edges can be soldered together.

The ends of the support members together with the fluid filter medium are connected together by a sealant such as epoxy resin or silicone rubber. The epoxy resin may be cold curable and have in general a viscosity of 14 poises to prevent capillary action of the fluid filter medium which would otherwise adsorb it. End caps of the same material as the sealant can be formed integrally therewith. For practical purposes however the ends are dipped in sealant and placed in end caps of any suitable metal or plastics material as hereinbefore mentioned.

One of the end caps may be provided with a tubular screw threaded coupling element for attaching the filter to, for example, the air inlet of an autoclave.

A filter as described above can be fitted with an outer sock or sleeve which, if desired, may function as a prefilter and which will be formed of porous material (e.g. expanded synthetic rubber, foam rubber or foamed polyurethane) which can be stretched over the main filter structure so as to make intimate contact therewith and fluid tight contact with the inner edges of the end caps. This sleeve is conveniently of a flexible porous plastics material of such a character that it can be washed periodically through its working life. The fluid filter medium is not necessarily intended to be cleaned and may be discarded after its useful life has been completed.

The invention will now be described further, by way of example, with reference to the accompanying drawings, in which.

The filter comprises an outer perforated cylinder 10 and an inner perforated cylinder 11, a top cap 12 and a base cap 13.

Figure 4:
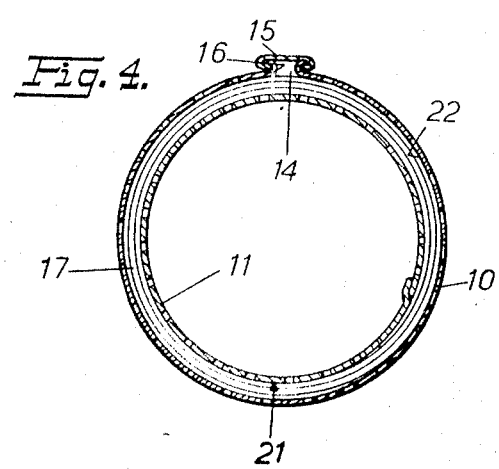
FIG. 4 is a cross-section of the constructions and arrangement of the main filter elements.

The inner perforated cylinder 11 is covered by a filter cloth 21 and subsequently wrapped with three layers of ultra high efficiency 100% glass fibre fluid filter medium layer 17. It is then covered by another filter cloth 22 after which the outer cylinder 10 is positioned. A vertical joint 14 (FIG. 4) in the outer cylinder is then closed and secured by means of a slide-on fastener 15 which extends from top to bottom of the outer perforated cylinder and embraces outwardly turned flanges 16 of the outer cylinder.

The flanged top cap and flanged base cap 12 and 13 are then fitted over the ends of the main filter structure comprising the perforated cylinders 10 and 11, the glass fibre filter layer 17 and the ends of the slide fastener 15. A slide fastener is not essential but the filter layer 17 must be clamped in place when using micro-fibre sizes to prevent both movement of the fibres and also to achieve the desired packed density of fibre media.

Figure 1:
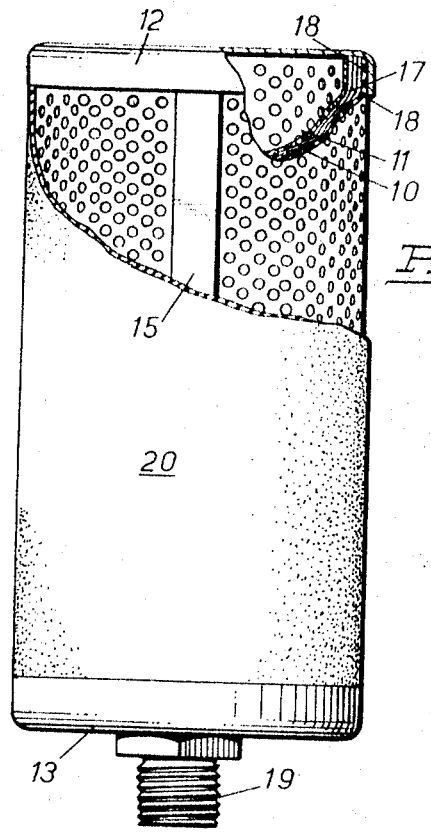
FIG. 1 is an elevation of a filter (and sleeve) constructed in accordance with the invention.
Figure 2:
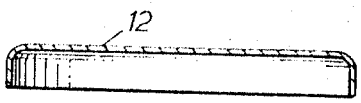
FIG. 2 is a section through an upper end cap.
Figure 3:
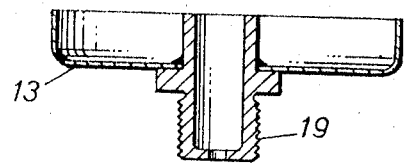
FIG. 3 is a section through a lower end cap.

The ends of the main filter structure are then permanently sealed in the top cap 12 and base 13 by dip sealing with silicon rubber. The sealant is poured into one end and the filter structure is "potted." When the sealant in one end cap has cured the second end is similarly "potted." The sealant penetrates into any spaces, as indicated at 18 in FIG. 1. Thus air is constrained to flow entirely through the perforated cylinders 10 and 11 and the filter layer 17 therebetween.

When the filter is to be used in an autoclave the base 13 has a central orifice or port fitted with a screwed unit 19 for connecting the filter to the fluid inlet port of the autoclave. The size of the orifice in the base depends on the size of the filter and is selected so as to limit the rate of fluid and prevent excessive strain on the filter media and supporting structure.

Before being put into use, the filter unit above described, due to its construction and particularly the manner in which the main filter structure is sealed in the top cap 12 and base cap 13, may be steam sterilized.

In use and to ensure a long working life a flexible porous sock or sleeve 20 of plastics material (e.g. foamed polyurethane) is fitted or stretched over the filter structure above described. This sock or sleeve can be washed from time to time as required.

I claim:

1. A filter for fluids comprising:

inner and outer fluid permeable support members, said inner fluid permeable support member being located within said outer fluid permeable support member;

a body of fibrous fluid filter medium disposed between said support members, said fibrous fluid filter medium having fibers distributed within, the distribution and dimensions of said fibres in said body of fibrous filter medium being adapted for the complete removal from fluids of substances having dimensions of the order of one micron and less, said fibrous filter medium being free of cohesive material and being compressed by said inner and outer support members to prevent movement of said fibres at elevated pressure differentials;

conduit means connected to said inner fluid permeable support member for communicating fluid therein;

said filter medium being bounded by operational surfaces;

boundary layers of porous sheet material disposed between said support members and said operational surfaces for reinforcing said filter medium, said support members and said boundary layers having passageways disposed for permitting passage of fluid at elevated pressure without rupture of said fibrous fluid filter medium, said operational surfaces being in intimate contact with said boundary layers which are in intimate contact with said support surfaces;

said fibrous fluid filter medium having edge regions juxtaposed between said fluid permeable support members;

a fluid impervious sealant, said fluid impervious sealant penetrating said edge regions of said fibrous fluid filter medium and forming a bond between said edge regions and said juxtaposed fluid permeable support members;

one of said support members being constructed to permit it to move toward said other support member to compress said filter medium between said support members and having clamping means for maintaining the position of said one support member relative to the other for maintaining the compression of said filter medium.

2. A filter according to claim 1 further comprising:

first and second filter caps dip sealed to the end regions of said fluid permeable support members;

said filter permeable support members being made of perforated metal, said boundary layers being made of woven filter cloth, and at least one of said filter caps being connected with said conduit means for communicating fluid within said inner fluid permeable support member.

3. A filter according to claim 1 further comprising:

a longitudinal joint provided in said outer fluid permeable support member, said clamping means being connected with said outer fluid permeable support member on each side of said longitudinal joint; and first and second filter caps dip sealed to the end regions of said fluid permeable support members, at least one of said filter caps being connected with said conduit means for communicating fluid within said inner fluid permeable support member.

4. A filter according to claim 3 further comprising:

a porous outer sock covering said outer fluid permeable support member;

said fluid permeable support members being made of perforate metal, said boundary layers being made of woven filter cloth.

5. A filter according to claim 3 further comprising:
outwardly turned flanges formed longitudinally on said outer fluid permeable support member;
said clamping means comprising a slide-on fastener engageable with said flanges which are pulled toward one another by said fastener; and
a porous outer sock covering said outer fluid permeable support member;
said fluid permeable support members being cylindrical and made of perforate metal.

6. A filter according to claim 5 wherein said fibrous fluid filter medium comprises borosilicate fibres having diameters in the range of from 0.05 to 2.59 microns.

References Cited

UNITED STATES PATENTS

| | | | |
|---|---|---|---|
| 945,632 | 1/1910 | Strahl | 55—486 X |
| 1,693,741 | 12/1928 | Wuest | 210—497 X |
| 2,550,070 | 4/1951 | Brecque et al. | 210—457 X |
| 3,016,345 | 1/1962 | Price | 210—187 |
| 3,016,984 | 1/1962 | Getzin | 210—232 X |
| 3,026,609 | 3/1962 | Bryan | 29—419 |
| 3,034,981 | 5/1962 | Poelman et al. | 210—509 X |
| 3,060,119 | 10/1962 | Carpenter | 210—500 X |
| 3,123,456 | 3/1964 | Boltz et al. | 210—460 X |
| 3,186,551 | 6/1965 | Dornauf | 210—243 |
| 3,290,870 | 12/1966 | Jensen | 210—315 X |

FOREIGN PATENTS

| | | |
|---|---|---|
| 555,812 | 9/1943 | Great Britain. |
| 750,396 | 6/1956 | Great Britain. |
| 832,890 | 4/1960 | Great Britain. |
| 607,353 | 8/1960 | Italy. |
| 608,479 | 9/1960 | Italy. |

OTHER REFERENCES

Humphrey et al., "Air Sterilization by Fibrous Media," Industrial & Engineering Chemistry, May 1955, vol. 47, No. 5, pp. 924–930.

REUBEN FRIEDMAN, Primary Examiner

FRANK A. SPEAR, JR., Assistant Examiner

U.S. Cl. X.R.

55—485 ;210—457, 460, 489, 494, 497